R. MOELLER.
FLUID MIXING AND REGULATING DEVICE.
APPLICATION FILED NOV. 28, 1911.
1,112,641.
Patented Oct. 6, 1914.
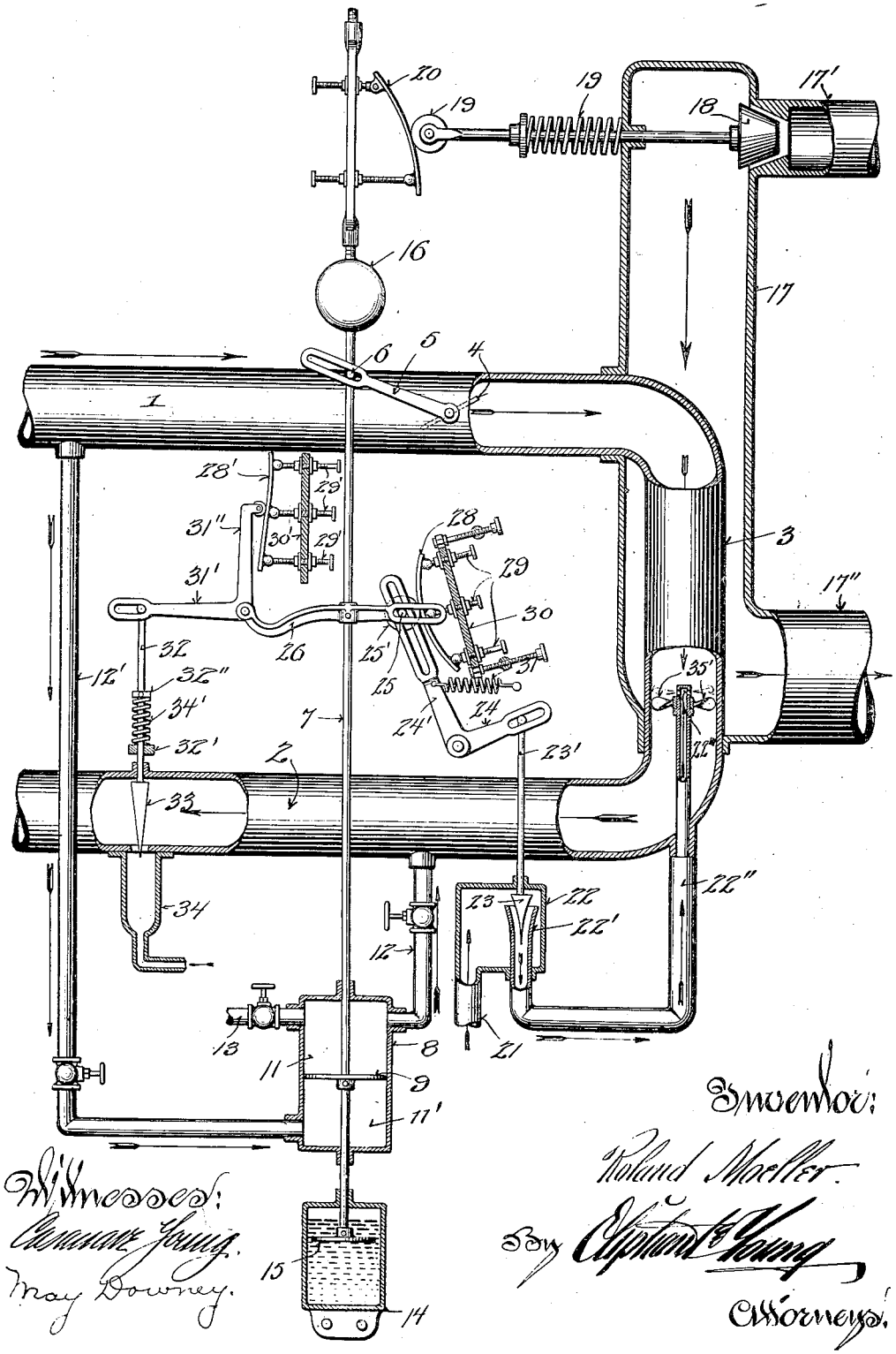

UNITED STATES PATENT OFFICE.

ROLAND MOELLER, OF MILWAUKEE, WISCONSIN.

FLUID MIXING AND REGULATING DEVICE.

1,112,641.  Specification of Letters Patent.  Patented Oct. 6, 1914.

Application filed November 28, 1911. Serial No. 662,906.

*To all whom it may concern:*

Be it known that I, ROLAND MOELLER, a citizen of the United States, and resident of Milwaukee, in the county of Milwaukee and State of Wisconsin, have invented certain new and useful Improvements in Fluid Mixing and Regulating Devices; and I do hereby declare that the following is a full, clear, and exact description thereof.

The primary object of my invention is to provide simple, economic, automatic means for regulating the valves in one or more fluid passages in a predetermined fixed manner under control of an active master fluid that constitutes one element of the process herein concerned. The valves may control the master fluid, secondary fluids that mix with the master fluid, and secondary fluids that act merely as conveyers of heat.

Generically in carrying out my invention it is contemplated to employ a main fluid channel and a floating member that is controlled by the change in flow or pressure in the said channel. This floating member constitutes a master regulator that actuates one or more valves through manually adjustable cam surfaces whereby each valve is automatically regulated in a predetermined manner, it being understood that the means of controlling each valve is provided with means whereby the independent adjustment of the extent of movement and the direction of the movement of each particular valve is accomplished in a predetermined proportion to the movement of the regulator, which in turn is controlled by the flow in the main fluid channel. In brief the invention contemplates the interposition of a manually adjustable cam surface between the floating member or master regulator and operating mechanism of a secondary valve, whereby movements of the regulator are imparted to the secondary valve mechanism through the interposition of the said cam surface in order that the rate of flow of a secondary fluid may be fixed in any definite ratio to and for any rate of flow of the master fluid by predetermined adjustment and when so adjusted the ratio of the flows of the fluids for that rate of flow of the master fluid concerned will remain constant.

Specific objects of my invention are to provide a master regulator having a force the magnitude of which is governed by a fixed law in opposition to variable fluid pressure exerted upon the shiftable member of the regulator, the action of the variable fluid pressure being adjustable by suitable means; to provide adjustable cam surfaces for independent regulation of the various fluid-controlling valves relative to a fixed or master impulse whereby all of said valves are actuated; to provide means for adjusting the angle of the entire cam; to provide means for indirectly heating the fluid mixture, and means for regulating the heat as necessary in proportion to the volume of said mixture; to provide means in connection with the master regulator whereby the various valves are under master control; to provide means for breaking up and evenly distributing liquid incidental to its discharge into the combination of fluids, and to provide a dash-pot in connection with the master regulator whereby flutter or sudden vibratory impulse of the same is absorbed.

With the above and other objects in view the invention consists in certain peculiarities of construction and combination of parts as hereinafter set forth with reference to the accompanying drawings and subsequently claimed.

The drawing illustrates a diagram view with parts broken away and parts in section, of a fluid mixing and regulating device embodying the features of my invention, the same being arranged for mixing various fluids to be utilized as an explosive for internal combustion engines.

To operate an internal combustion engine economically it is necessary to maintain a certain ratio to each other of the various components entering into the combustible mixture, the ratio changing as the speed or power output of the engine varies. The ratio in question is determined by the condition under which the combustion takes place with the greatest efficiency in the operation of the engine. It is also desirable to have a minimum resistance to the ingoing mixture inasmuch as such resistance is a factor that tends to decrease the efficiency and also the maximum power of the engine. It is also desirable to maintain a certain temperature of the combustible mixture, so as to facilitate the evaporation of any liquids that enter therein and when said liquids enter into the mixture it is desirable in some instances to facilitate evaporation as much as possible by mechanical means. Hence in the accompanying diagram I have illustrated means for forming a mixture, composed of air, kerosene and steam and I have also provided means under valve control for subjecting said fluid mixture to heat, it being understood that under some conditions and with certain other fluids, where my invention is embodied in a carbureter, the valve controlled steam inlet and heating fluid regulation may be dispensed with.

Referring by characters to the drawing, 1 represents the intake and 2 the discharge ends of a main fluid channel, the same, for convenience of illustration being shown in the form of a loop having a vertically disposed leg 3. Mounted within and intermediate of the ends of the channel is a main valve 4 of the butterfly type, one trunnion of which valve has secured thereto an actuating arm 5 that is slotted at its free end for engagement with a pin 6 that is carried by a vertically reciprocative rod 7. The lower portion of rod 7 passes through heads of a housing 8, which housing constitutes a chamber for a piston 9, that is secured to said rod. The piston is adapted to move within the chamber and the contrivance is so constructed that the piston is, as shown, suspended intermediate of the heads of the chamber, whereby upper and lower compartments 11, 11', respectively, are formed in said chamber. The upper compartment 11 is connected to the discharge end of the main fluid channel, by means of a valve-controlled by-pass pipe 12, and the lower compartment 11' is similarly connected to the fluid intake end 1 of said main channel (which opens into the atmosphere) by means of a valve-controlled by-pass pipe 12', which might in some instances communicate with the atmosphere directly. The upper compartment of the housing 8 is also provided with a valve-controlled pipe 13 that communicates with the atmosphere, it being understood that the by-pass pipes 12, 12' constitute a loop about the main channel valve 4 and that the piston and housing interposed between said by-pass pipes constitute a form of master regulator. It is understood that any of the valves in the pipes 12, 12' and 13 may be dispensed with and the principle of operation remain unchanged.

The lower end of the rod 7 projects through a gland that is formed in the head of a shell 14, and carries a floating disk 15 that is of slightly less area than said shell. The disk is immersed in a liquid contained in the shell whereby movement of the rod is retarded in either direction, said retardation being obviated by the dash-pot element just described, to prevent vibrations of the rod incidental to slight variations of the fluid which controls movement of the master regulator. It should be understood that any other form of dash-pot arrangement, connected to any moving part of the mechanism may accomplish the same result.

The upper end of the rod 7, as shown, is provided with a weight 16, whereby force is applied to the shiftable member or piston 9 of the regulator, in opposition to the resultant of the variable fluid pressures acting in the opposite direction on the said piston through the pipes 12, 12' and 13. It should be understood however, that, while I have shown and described the master regulator in the form of a cylindrical housing provided with a reciprocative piston it is apparent that any shiftable member arranged to partition a chamber may be substituted therefor, and that the clearance between the shiftable member and the housing may vary in different positions of the said member.

A jacket 17 is fitted about the vertical leg 3 of the master channel whereby heat is indirectly applied to the walls of the main fluid channel for the purpose of controlling the temperature of fluid mixture passing therethrough. The upper end of the jacket in this instance is connected through pipe 17' with the exhaust pipe of the engine to which the device is applied, or other suitable source of heat supply and the lower end of said jacket is provided with a waste pipe 17''. The heat supply pipe 17' is controlled by valve 18, the stem of which carries an anti-friction roller 19 for engagement with an adjustable cam-plate 20, which cam-plate is carried by the rod 7, the valve being normally held open by a coiled spring 19' that is interposed between the heating jacket and a collar carried by said stem. By the above described mechanism heat will be supplied from the hot spent gases of the engine under control of the master regulator.

A liquid-supply pipe 21 having a head 22 is also provided, which head has projecting therein the mouth 22' of a feed-pipe 22'' that extends into and is concentric with the vertical leg 3 of the main fluid channel. The pipes 21 and 22', in conjunction with the head 22 form a fluid feed-channel and, in this instance, is utilized for supplying kerosene, which is discharged into the main fluid channel leg 3, the mouth 22' being under control of a tapered valve 23, the stem 23' of which is provided with a pin that engages the slotted end of an arm 24 of a bell-crank. The opposite arm 24' of said bell-crank is also provided with a slotted end for the reception of a trunnion 25 of an anti-friction roller 25'. The roller trunnion 25 is also in engagement with a horizontally disposed slot, formed in one end of a cross-head 26, which cross-head is carried by the rod 7, it being understood that the slotted end of the bell-crank arm 24' is disposed at an approximate right angle to the slotted end of the cross-head. The roller 25' is arranged to engage and travel upon a flexible cam-rail 28, the curvature and position of which rail are regulated by a series of adjusting screws 29 that are mounted in a block 30. The roller 25' is normally held into engagement with the cam-rail by a coiled spring 31 which is connected to the bell-crank lever that serves as a keeper for said roller. Provision is made for a master adjustment of the cam-rail 28 by set-screws 30'' which engage the block 30 whereby the position or angle of the entire cam-rail can be varied independent of its contour adjustment. By the above described construction it is apparent that when the rod 7 moves, the cross-head will cause the anti-friction roller to travel along the contour of the cam-rail, a movement of the bell-crank incidental to travel of said roller will thus control valve 23 whereby the flow of kerosene will be regulated. The opposite end of the cross-head 26 carries a bell-crank lever, one arm 31' of which is slotted, for the reception of a pin that forms part of a valve-stem 32, which valve-stem extends into the discharge end 2 of the main fluid channel and carries a tapered valve 33 that controls the mouth of a steam inlet pipe channel 34 that communicates with said main channel. The stem 32 is guided within an apertured block 32', and interposed between said block and a collar 32'' carried by the stem is a coiled spring 34' which coiled spring serves to hold the valve 33 normally open. The opposite arm 31'' of the bell-crank, which controls valve-stem 32, carries an anti-friction roller for engagement with a flexible cam-rail 28', which cam-rail is adjustable as to pitch by means of set-screws 29' that are similar in construction to those previously described in connection with the valve mechanism for controlling the supply of kerosene. It is apparent that in the case of each secondary valve the block itself may be adjustable thus providing a master adjustment for the whole by means of set-screws 30'' as shown, and also that a slide or any other suitable means may be used instead of the roller, and also that the adjustment of the cam surface may be obtained by the use of wedges, eccentric rollers, or any other mechanical means. Also the roller may be held in contact with the cam surface through gravity, fluid pressure, etc. Furthermore, it is apparent that a large number of combinations other than those illustrated can be designed using the adjustable cam surface to attain the results herein set forth. For example, the surface may be part of a bell-crank pivoted on an element moved by the regulator, or one that is pivoted on a stationary part of the device, etc., and the curved surface may have a rotary motion as well as a longitudinal motion.

The steam channel valve 33 operates similar to the fluid valve 23, and is adapted to operate as rod 7 of the master regulator moves, the valve being actuated through the bell-crank and its adjustable cam connection incidental to rise and fall of the bell-crank carrying yoke 26 and rod 7 through movement imparted thereto by the master regulator.

In order to break up and thoroughly mix the liquid which is injected into the main fluid channel, I provide a spreader which comprises a wheel 35' provided with a series of vanes, the wheel being loosely mounted upon an extension of the fluid pipe 22''. The end of this fluid pipe extension is closed and has a series of radially disposed apertures 22''' that are located on the side of the spreader wheel whence the flow comes from, whereby fluid is radially discharged in juxtaposition to the wheel vanes, and, owing to the fact that the wheel is revolved by the flow of the fluid through the main channel, the liquid coming in contact with said vanes will be broken up and distributed by contact with the vanes by centrifugal force and the force of the other fluid into a fine spray whereby the other fluids, with which it commingles will be thoroughly mixed and converted into an explosive gaseous vapor prior to being delivered for use into the combustion chamber of an engine cylinder.

From the foregoing description it will be apparent that should the flow of the master fluid increase in volume, the valve 4, due to its position will offer increased resistance thereto. Back-pressure of said fluid continues to exert force upon the lower face of the piston 9 through the by-pass pipe 12', while on the other hand the partial vacuum upon the upper face of the piston will be increased due to the by-pass pipe connections 12 that communicate with the main channel upon the discharge side of the main valve 4. Thus the piston will rise, in opposition to the fixed force which, in this instance, is supplied by the weight 16. The rod 7 of the master regulator will move upwardly and through its connections with main valve 4, cause the same to open still farther, whereby the restriction in the main channel is reduced, causing the master fluid or air to flow more freely therethrough, until equilibrium is reëstablished. The valves controlling the secondary fluids comprising steam and kerosene and exhausted gases will likewise be operated, due to the valve mechanism and their connection with the master regulator rod 7. Should the master fluid be decreased in volume it is also apparent that the valve 4 will move in the reverse direction from that just mentioned, whereby the main channel will be restricted, causing a corresponding decrease in the vacuum force exerted upon the master regulator piston 9. The fixed or constant force comprising the weight will then act to cause the rod 7 to drop, whereby valve 4 will turn toward the closed position until equilibrium is reëstablished. A restricted passage is then established to correspond to the lesser flow of the master fluid.

It will be noted that since, as the flow of the master fluid increases, the valve 4 will be so moved as to decrease the resistance to the flow and vice versa, the regulator tends to maintain a constant vacuum in the carbureter. In other words, the more air is drawn through, the smaller the resistance to its flow, a condition which is very desirable.

It should be understood that the valve 4 may be of any type, as for example, clack-valve, cylinder valve, gate valve, balanced valve, slide valve, conical valve, etc., and operated by the regulator through various mechanical means, as by direct connection, by a crank and connecting rod, by a tie-rod and crank, or through the agency of the adjustable cam mechanism herein described. Also the two functions may even be combined in one element without departing from the spirit of my invention. It is also apparent that I may, without departing from the spirit of my invention, use a spring, an independent fluid pressure or any other suitable means in opposition to the vacuum and fluid force that controls the master regulator in one direction. Again, it is evident that any mechanical contrivance in which the position of a mechanical element varies with and depends on the flow of a master fluid, can be used as a regulator as herein described. It will further be apparent that the rod 7 which is connected to the master regulator has a limited movement, being operated in one direction by a predeterminedly fixed force, and in the opposite direction by fluid pressure and vacuum forces introduced upon opposite sides of the piston 9. Hence owing to this movement of the master regulator rod being fixed or limited, in order to control or vary the movements of the various auxiliary valves, independent of the movement of said rod, each valve mechanism as described is provided with an adjustment whereby an initial predetermined movement of the rod 7 will control the position of the various auxiliary valves, depending upon the amount of each fluid it is desired to inject into the mixture that is controlled by a particular valve.

In the device as illustrated in the diagram the parts are shown in an operating condition with the flow of the master fluid approximately three quarters of the maximum. In this instance the master fluid utilized is air and is supplied by suction from the engine piston in the usual manner, the auxiliary or secondary fluids being kerosene and steam.

The operation is as follows: The master fluid or air in passing from the inlet to the discharge end of the main channel will receive the various secondary fluids in their proper proportions owing to the fact that the valves controlling the inlets of said secondary fluids are partly opened. Should the flow of the master fluid increase or decrease in volume the rod 7 of the master regulator will move upwardly or downwardly respectively, the valves controlling the secondary fluids comprising steam and kerosene and exhaust gases will likewise be operated, due to the valve mechanism and their connection with the master regulator rod 7. Hence it will be seen that the proper flow of each of the secondary fluids varies automatically with the flow of master fluid in a predetermined manner as fixed by the adjustments hereinbefore described. It is also apparent that I may apply a suitable calibrated scale to the rod 7 on which the position of the movements of the master controlling piston can be registered, whereby the same can be used as a flow measuring gage for the fluids which pass through the main channel and that by suitable adjustment of the valves in the by-pass pipes 12 and 12' and vent-nozzle 13, I may adjust the movement and ease of action of the master regulator, to meet the requirements to the finest degree of sensibility. It will also be understood that, while I have shown the main fluid channel in the form of a loop, that the same result can be obtained by a channel having any form of passage, and that the same may be provided with any form of main controlling valve mechanism herein referred to as regulator. The regulator may be in a chamber in communication with the main channel or in the main channel itself, said regulator including a shiftable member which is adapted to control one or more valves.

I claim:

1. A device of the character described comprising a fluid channel having a master valve therein, a master regulator in connection with said valve, by-passages connecting the regulator with the fluid channel upon opposite sides of the master valve, a secondary fluid channel in communication with said master channel, a controlling valve therefor, actuating mechanism for the secondary fluid channel controlling valve, and an adjustable surface interposed between the secondary valve mechanism and master regulator through which motion is transferred from said master regulator to the aforesaid secondary valve.

2. A device of the character described comprising a fluid channel having a master valve therein, a housing, a reciprocative piston mounted in the housing, a rod in connection with the piston, a by-pass in communication with the master fluid channel upon one side of the valve and housing below the piston, a second by-pass in communication with the fluid channel upon the opposite side of the master valve and housing above the piston, a secondary fluid channel in communication with said master channel, a controlling valve therefor, actuating mechanism for the secondary fluid channel controlling valve, a flexible cam surface interposed between the secondary valve mechanism and master regulator rod through which motion is transferred from said master regulator to the aforesaid secondary valve.

3. A device of the character described comprising a fluid channel having a master valve therein, a housing, a reciprocative piston mounted in the housing, means connecting the piston and master valve, a by-pass in communication with the master fluid channel upon one side of the housing piston, a secondary fluid channel in communication with said master channel, a controlling valve therefor, actuating mechanism for the secondary fluid channel controlling valve, an adjustable cam surface interposed between the secondary valve mechanism and piston through which motion is transferred from said piston to the aforesaid secondary valve.

4. A device of the character described comprising a fluid channel having a master valve therein, a housing, a reciprocative piston mounted in the housing, means connecting the piston and master valve, a by-pass in communication with the master fluid channel upon one side of the housing piston, a controlling valve for the by-pass, a secondary fluid channel in communication with said master channel, a controlling valve therefor, actuating mechanism for the secondary fluid channel controlling valve, an adjustable cam surface interposed between the secondary valve mechanism and piston through which motion is transferred from said piston to the aforesaid secondary valve.

5. A device of the character described comprising a fluid channel having a master valve therein, a master regulator in connection with said valve, by-passes connecting the regulator with the fluid channel upon opposite sides of the master valve, a secondary fluid channel in communication with said master channel, a controlling valve therefor, actuating mechanism for the secondary fluid channel controlling valve, a fixed flexible surface arranged to be engaged by the secondary valve actuating mechanism, means for adjusting the contour of said flexible surface at various points throughout its length, and means under control of the regulator carried by the secondary valve actuating mechanism for engagement with the aforesaid flexible surface.

6. A device of the character described comprising a fluid channel having a master valve therein, a master regulator in connection with said valve, a constant force adapted to oppose the regulator in one direction, a by-pass connecting the regulator with the fluid channel whereby a varying force is applied to said regulator in opposition to the constant force, a secondary fluid channel in communication with said master channel, a controlling valve therefor, actuating mechanism for the secondary fluid channel controlling valve, a flexible cam surface interposed between the secondary valve mechanism and master regulator through which motion is transferred from said master regulator to the aforesaid secondary valve, and a series of independent adjustable members for the flexible cam surface.

7. A device of the character described comprising a fluid channel having a master regulator in communication therewith, a secondary fluid channel in communication with said master channel, a controlling valve therefor, actuating mechanism for the secondary fluid channel controlling valve, an adjustable surface for controlling movement of the secondary valve actuating mechanism, means connecting the master regulator and actuating mechanism of the secondary valve, and a revoluble vane mounted within the main fluid channel adapted to exert centrifugal force upon fluid discharged from the secondary fluid channel.

8. A device of the character described comprising a main fluid channel having a master valve therein, a master regulator in connection with the valve, by-passages connecting the regulator with the fluid channel upon opposite sides of the master valve, a secondary fluid channel in communication with said master channel, a controlling valve therefor, a bell-crank lever having one arm connected to the controlling valve, a roller in slidable connection with the opposite arm of the bell-crank, a flexible cam-track for engagement with the roller, means for adjusting the contour and position of the cam-track at various points throughout its length, and a shackle connection between the master regulator and roller whereby movement is imparted thereto.

9. A device of the character described comprising a main fluid channel having a master valve therein, a vented housing, a gravity-controlled regulator piston mounted in the housing, means connecting the regulator piston and master valve, a vacuum by-pass in communication with the upper end of said housing and fluid channel whereby said regulator is moved in opposition to gravity, a secondary fluid channel in communication with said main channel, a controlling valve therefor, actuating mechanism for the secondary fluid channel controlling valve, a flexible surface interposed between the secondary valve mechanism and master regulator through which motion is transferred from said master regulator to the aforesaid secondary valve, and means for adjusting the contour of said surface at intervals throughout its length.

10. A device of the character described comprising a fluid channel, an automatic master regulator in communication therewith, a secondary fluid channel, a valve therefor, actuating mechanism for the secondary fluid channel valve, and an adjustable surface interposed between the secondary valve mechanism and master regulator through which motion is transferred from said master valve to the aforesaid secondary valve.

11. A device of the character described comprising a fluid channel, an automatic master regulator in communication therewith, a secondary fluid channel in communication with the first mentioned channel, a valve therefor, actuating mechanism for the secondary fluid channel valve, and an adjustable surface interposed between the secondary valve mechanism and master regulator through which motion is transferred from said master regulator to the aforesaid secondary valve.

12. A device of the character described comprising a fluid channel having a master valve therein, a gravity-controlled regulator in connection with the valve, a by-pass connection between the regulator and fluid channel, a secondary fluid channel in communication with the main channel, a controlling valve for the secondary fluid channel, actuating mechanism for the controlling valve, and an adjustable flexible cam surface interposed between the secondary controlling valve and regulator through which motion is transferred from the aforesaid regulator to said secondary valve.

13. A device of the character described comprising a fluid channel having a master valve therein, a gravity-controlled master regulator in connection with the valve, a vacuum by-pass communicating between the regulator and fluid channel whereby said regulator is moved in one direction in opposition to gravity, a secondary fluid channel in communication with said master channel, a controlling valve therefor, actuating mechanism for the secondary fluid channel controlling valve, and an adjustable flexible cam surface interposed between the secondary valve mechanism and master regulator through which motion is transferred from said regulator to said secondary valve.

14. A device of the character described comprising a fluid channel having a master valve therein, a housing, a reciprocative piston mounted in the housing, means connecting the piston and master valve, a by-pass in communication with the master fluid channel upon one side of the housing piston, a regulator valve for the by-pass, a secondary fluid channel in communication with said master channel, a controlling valve therefor, actuating mechanism for the secondary fluid channel controlling valve, an adjustable cam surface interposed between the secondary valve mechanism and piston through which motion is transferred from said piston to the aforesaid secondary valve.

15. A device of the character described comprising an automatic gravity controlled regulator, a valve, intermediate connections between said valve and said automatic regulator, and means coöperating with said intermediate connections, whereby the effect of said automatic regulator upon the valve may be varied at various points in the stroke of said automatic regulator.

16. A device of the character described comprising a fluid channel, an automatic gravity controlled regulator, a secondary fluid channel, a valve therefor, intermediate connections between said valve and said automatic regulator, and means coöperating with said intermediate connections, whereby the effect of said automatic regulator upon the valve may be varied at various points in the stroke of said automatic regulator.

17. A device of the character described comprising a main fluid channel, an automatic gravity-controlled master regulator in communication therewith, a secondary fluid channel, a controlling valve therefor, actuating mechanism for the secondary fluid channel valve, and an adjustable surface interposed between the secondary valve mechanism and master regulator, through which motion is transferred from said master regulator to the aforesaid secondary valve.

18. A device of the character described comprising a fluid channel, a valve controlling said fluid channel, an automatic gravity controlled valve mechanism, intermediate connections between said automatic valve mechanism and the said valve, an adjustable cam coöperating with said intermediate connections, whereby the effect of said automatic valve mechanism upon said valve in the channel may be varied at various points in the stroke of the said automatic valve mechanism.

19. A device of the character described comprising a main fluid channel having a valve therefor, a master gravity controlled regulator in connection with the valve, a secondary fluid channel in communication with said main channel, a controlling valve therefor, actuating mechanism for the secondary fluid channel controlling valve, and an adjustable surface interposed between the secondary valve mechanism and master regulator through which motion is transferred from said master regulator to the aforesaid secondary valve.

20. A device of the character described comprising a main fluid channel having a valve therein, a master regulator in connection with said valve, by-passages connecting the regulator with the fluid channel upon opposite sides of the said valve, a secondary fluid channel in communication with said main channel, a controlling valve therefor, actuating mechanism for the secondary fluid channel controlling valve, and an adjustable surface coöperating with the secondary valve mechanism and master regulator to control the motion which is transferred from said master regulator to the aforesaid secondary valve.

21. A device of the character described comprising a fluid channel having a valve therein, a housing, a reciprocative partition mounted in the housing, a movable element coacting with said partition, a passage in communication with the master fluid channel upon one side of the valve and housing on one side of the partition, a second by-pass in communication with the fluid channel upon the opposite side of the master valve and housing on the other side of the partition, a secondary fluid channel in communication with said master channel, a controlling valve therefor, actuating mechanism for the secondary fluid channel controlling valve, a flexible cam surface coöperating with the secondary valve mechanism and movable element to control the motion which is transferred from said partition to the aforesaid secondary valve is controlled.

22. A device of the character described comprising a fluid channel, an automatic shiftable member which is yieldingly displaced against the force of gravity more or less as the rate of flow of a fluid in said channel is greater or less, a secondary fluid channel, a controlling valve therefor, actuating mechanism for the secondary channel controlling valve, a suitable cam coöperating with the secondary valve mechanism and said shiftable member through which the relative motion of the two is controlled, and means for adjusting the contour of the working face of said cam at various points.

23. A device of the character described comprising a fluid channel, a valve therein, an automatic shiftable member which is yieldingly displaced against the force of gravity more or less as the rate of flow of a fluid in said channel is greater or less, a secondary fluid channel, a controlling valve therefor, actuating mechanism for the secondary channel controlling valve, a suitable cam coöperating with the secondary valve mechanism and said shiftable member through which the relative motion of the two is controlled, and means for adjusting the contour of the working face of said cam at various points.

24. A device of the character described comprising a fluid channel, a valve therein, a by-pass around the valve, an automatic shiftable member in the by-pass which is yieldingly displaced more or less as the rate of flow of a fluid in said channel is greater or less, a secondary fluid channel, a controlling valve therefor, actuating mechanism for the secondary channel controlling valve, a suitable cam coöperating with the secondary valve mechanism and said shiftable member through which the relative motion of the two is controlled, and means for adjusting the contour of the working face of said cam at various points.

25. A device of the character described, comprising a fluid channel having in communication therewith a casing with an automatic shiftable member which is yieldingly displaced against gravity more or less as the rate of flow of a fluid in said channel is greater or less, a secondary fluid channel, a controlling valve therefor, actuating mechanism for the secondary channel controlling valve, a suitable cam coöperating with the secondary valve mechanism and said shiftable member through which the relative motion of the two is controlled, and means for adjusting the contour of the working face of said cam at various points.

26. A device of the character described comprising a main fluid channel having therein a valve yieldingly held by gravity in a closing position, a secondary channel, a valve therefor, intermediate connections between the said main channel valve and the said secondary channel valve, whereby motion is transferred from one to the other, and means coöperating with said intermediate connections whereby the effect of the displacement of either valve may be varied at various points in the stroke of the other.

27. A device of the character described comprising a main fluid channel having therein a valve yieldingly held by gravity in a closing position, a primary fluid channel in communication with said main channel, a secondary channel, a valve therefor, said secondary channel communicating with the other channels, intermediate connections between the said main channel valve and the said secondary channel valve, whereby motion is transferred from one to the other, and means coöperating with said intermediate connections whereby the effect of the displacement of either valve may be varied at various points in the stroke of the other.

28. A device of the character described comprising a main fluid channel having therein a valve yieldingly held by gravity in a closing position, a primary channel having a valve therefor in communication with said main channel, a secondary channel, a valve therefor, said secondary fluid channel communicating with the other channels, intermediate connections between the said main channel valve and the said secondary channel valve, whereby motion is transferred from one to the other, and means coöperating with said intermediate connections whereby the effect of the displacement of either valve may be varied at various points in the stroke of the other.

29. A device of the character described comprising a fluid channel, a valve therefor, a casing, means of communication between said channel and casing, a shiftable member in said casing which is yieldingly displaced from its neutral position more or less as the flow of the fluid in said channel is greater or less, and means whereby the said shiftable member operates the said valve.

30. A device of the character described comprising a fluid channel, a valve, a casing, means of communication between said channel and casing, means to adjust the freedom of flow of fluid in said means of communication, a shiftable member in said casing which is yieldingly displaced from its neutral position more or less as the flow of the fluid in said channel is greater or less, and means whereby the said shiftable member operates the said valve.

31. A device of the character described comprising a main fluid channel, a secondary fluid channel with a valve therefor, a casing, means of communication between said main channel and casing, a shiftable member in said casing which is yieldingly displaced from its neutral position more or less as the flow of the fluid in the said main channel is greater or less, and means whereby the said shiftable member operates the said valve.

32. A device of the character described comprising a main fluid channel, a secondary fluid channel with a valve therefor, a casing, means of communication between said main channel and casing, means for adjusting the freedom of flow of fluid in said means of communication, a shiftable member in said casing which is yieldingly displaced from its neutral position more or less as the flow of the fluid in said main channel is greater or less, and means whereby the said shiftable member operates the said valve.

33. A device of the character described comprising a main fluid channel having a valve therefor, a secondary fluid channel with a valve therefor, a casing, means of communication between said main channel and casing, means to adjust the freedom of flow of fluid in said communications, a shiftable member in said casing which is yieldingly displaced from its neutral position more or less as the flow of the fluid in said main channel is greater or less, and means whereby the said shiftable member operates the said valves.

34. A device of the character described comprising a main fluid channel having a valve therefor, a secondary fluid channel having a valve therefor, a casing, a by-pass around said main channel valve of which said casing forms an integral part, a shiftable member in said casing which is yieldingly displaced from its neutral position more or less as the flow of the fluid in said main channel is greater or less, and means whereby the said shiftable member operates the said valves.

35. A device of the character described comprising an adjustable cam, a main fluid channel, a secondary fluid channel with a valve therefor, a casing in communication with said main channel, a movable partition in the casing, and a bell crank lever supported on a pivot which co-acts with the said partition, one arm of the bell-crank lever being in shiftable connection with the adjustable cam surface while the other lever arm is connected with the secondary channel valve controlling mechanism.

36. A device of the character described comprising an adjustable cam, a main fluid channel, a secondary fluid channel with a valve therefor, a casing having means of communication with said main channel, means of adjusting the freedom of flow or fluid in said means of communication, a movable partition in the casing, and a bell crank lever supported on a pivot which co-acts with the said partition, one arm of the bell-crank lever being in shiftable connection with the adjustable cam surface while the other lever arm is connected with the secondary channel valve controlling mechanism.

37. A device of the character described comprising a fluid channel having a valve therefor, a master regulator in connection with said valve, means of applying a force of predetermined magnitude to the regulator in one direction, a passage connecting the regulator with the fluid channel whereby a varying force is applied to said regulator in opposition to the said force of predetermined magnitude, a secondary fluid channel in communication with said master channel, a controlling valve therefor, actuating mechanism for the secondary fluid channel controlling valve, a flexible cam surface coöperating with the secondary valve mechanism and master regulator to control the motion which is transferred from said master regulator to the aforesaid secondary valve, and independent adjustable members for the flexible cam surface.

38. A device of the character described comprising a fluid channel having a valve therein, a master regulator in connection with said valve, by-passages connecting the regulator with the fluid channel upon opposite sides of the valve, a secondary fluid channel in communication with said master channel, a controlling valve therefor, actuating mechanism for the secondary fluid channel controlling valve, a fixed flexible surface arranged to be engaged by the secondary valve actuating mechanism, and means for adjusting the contour of said flexible surface at various points throughout its length.

39. A device of the character described comprising an adjustable cam, a main fluid channel, a secondary fluid channel with a valve therefor, a casing, a by-pass around a portion of the said main channel the casing forming an integral part of said by-pass, a movable partition in the casing, and a bell crank lever supported on a pivot which coacts with the said partition, one arm of the bell crank lever being in shiftable connection with the adjustable cam surface while the other lever arm is connected with the secondary channel valve controlling mechanism.

40. A device of the character described comprising a main fluid channel having a master regulator in communication therewith, a secondary fluid channel in communication with said main channel, a controlling valve therefor, actuating mechanism for the secondary fluid channel controlling valve, an adjustable surface for controlling movement of the secondary channel valve actuating mechanism, means connecting the master regulator and actuating mechanism of the secondary valve, and a removable vane mounted within the main fluid channel adapted to exert centrifugal force upon fluid discharged from the secondary fluid channel.

In testimony that I claim the foregoing I have hereunto set my hand at Milwaukee in the county of Milwaukee and State of Wisconsin in the presence of two witnesses.

ROLAND MOELLER.

Witnesses:
  F. W. WAMSER,
  WILLIAM POLACHECK.